(12) United States Patent
Hu

(10) Patent No.: US 12,331,839 B2
(45) Date of Patent: Jun. 17, 2025

(54) VALVE DEVICE

(71) Applicant: HANGZHOU AO KE MEI RUI TECHNOLOGY CO., LTD., Zhejiang (CN)

(72) Inventor: Meiyan Hu, Zhejiang (CN)

(73) Assignee: HANGZHOU AO KE MEI RUI TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/027,365

(22) PCT Filed: Sep. 26, 2021

(86) PCT No.: PCT/CN2021/120573
§ 371 (c)(1),
(2) Date: Mar. 20, 2023

(87) PCT Pub. No.: WO2022/151757
PCT Pub. Date: Jul. 21, 2022

(65) Prior Publication Data
US 2023/0407978 A1   Dec. 21, 2023

(30) Foreign Application Priority Data

Jan. 18, 2021   (CN) .......................... 202110065261.1

(51) Int. Cl.
*F16K 11/085*   (2006.01)
*F16K 3/24*   (2006.01)
(Continued)

(52) U.S. Cl.
CPC .......... *F16K 11/0856* (2013.01); *F16K 3/243* (2013.01); *F16K 5/0471* (2013.01);
(Continued)

(58) Field of Classification Search
CPC .... F16K 27/041; F16K 37/065; F16K 11/076; F16K 11/0856; F16K 3/243; F16K 5/0471
See application file for complete search history.

(56) References Cited

U.S. PATENT DOCUMENTS 699,818 A * 5/1902 Rylands ................... F16K 35/04
251/192
3,072,379 A * 1/1963 Hamer .................. F16K 5/0471
137/246.22
(Continued)

FOREIGN PATENT DOCUMENTS

| CN | 103742675 A | 4/2014 |
|---|---|---|
| CN | 206175729 U | 5/2017 |

(Continued)

OTHER PUBLICATIONS

WO-2018061892-A1 Translation (Year: 2018).*
(Continued)

*Primary Examiner* — Umashankar Venkatesan
(74) *Attorney, Agent, or Firm* — Yue (Robert) Xu; Apex Attorneys at Law, LLP

(57) ABSTRACT

Disclosed is a valve device, comprising a housing and a valve element assembly, wherein the housing is provided with a mounting cavity, part of the valve element assembly is located in the mounting cavity, the housing comprises a bottom portion and a side portion, a plurality of connector portions are formed on the side portion, the valve element assembly is provided with a communicating cavity, which is laterally open, the connector portions are in communication with each other by means of the communicating cavity, the valve element assembly is provided with a limiting portion, and the housing is provided with a stop portion.

16 Claims, 7 Drawing Sheets

(51) Int. Cl.
*F16K 5/04* (2006.01)
*F16K 11/076* (2006.01)
*F16K 27/04* (2006.01)
*F16K 27/06* (2006.01)

(52) U.S. Cl.
CPC .......... *F16K 11/076* (2013.01); *F16K 27/041* (2013.01); *F16K 27/065* (2013.01)

(56) References Cited

U.S. PATENT DOCUMENTS

| | | | | |
|---|---|---|---|---|
| 3,658,093 | A * | 4/1972 | Kirkwood | F16K 39/06 251/173 |
| 4,445,540 | A * | 5/1984 | Baron | F16L 45/00 137/625.43 |
| 4,988,077 | A * | 1/1991 | Conley | F16K 27/065 251/366 |
| 5,820,133 | A * | 10/1998 | Altshuler | F16K 11/0856 277/630 |
| 6,308,739 | B1 * | 10/2001 | Barbuto | F16K 5/0478 137/625.11 |
| 7,165,513 | B2 * | 1/2007 | Humburg | B60H 1/00978 165/41 |
| 7,484,490 | B2 * | 2/2009 | Teschner | F16K 3/243 123/190.17 |
| 9,995,405 | B2 * | 6/2018 | Duncan | F16K 11/0853 |
| 10,358,222 | B2 * | 7/2019 | Army | F16K 11/076 |
| 11,143,321 | B2 * | 10/2021 | Wawersig | F16K 31/043 |
| 11,156,300 | B2 * | 10/2021 | Bunda | F16K 27/065 |
| 11,214,375 | B2 * | 1/2022 | Kozlowski | F16K 11/0708 |
| 11,300,220 | B2 * | 4/2022 | Nomura | F16K 11/076 |
| 11,396,953 | B2 * | 7/2022 | Ma | F16K 27/041 |
| 2008/0223464 | A1 * | 9/2008 | Merrell | E04H 4/1209 137/625 |
| 2019/0219179 | A1 | 7/2019 | Sato | |
| 2020/0386323 | A1 | 12/2020 | Chapman et al. | |
| 2021/0180711 | A1 * | 6/2021 | Van Riel | F16K 5/0471 |

FOREIGN PATENT DOCUMENTS

| | | | |
|---|---|---|---|
| CN | 107830207 A | 3/2018 | |
| CN | 111828687 A | 10/2020 | |
| CN | 111981164 A | 11/2020 | |
| DE | 102022200540 A1 * | 7/2023 | |
| EP | 3109522 A1 | 12/2016 | |
| JP | H02-229971 A | 9/1990 | |
| JP | 3049769 U | 6/1998 | |
| JP | 2001-343077 A | 12/2001 | |
| KR | 10-2016-0117618 A | 10/2016 | |
| WO | WO-2018061892 A1 * | 4/2018 | ......... B60H 1/00485 |

OTHER PUBLICATIONS

DE 102022200540 Translation (Year: 2023).*
First Office Action dated Mar. 5, 2024 for Japanese patent application No. 2023-543139, English translation provided by Global Dossier.
International Search Report for PCT/CN2021/120573 mailed Dec. 7, 2021, ISA/CN.
First Office Action dated May 22, 2024 for Korean patent application No. 10-2023-7009426, English translation provided by Unitalen.
European Search Report issued on Dec. 9, 2024 for the European counterpart application No. 21918948.7.

* cited by examiner

VALVE DEVICE

This disclosure is a national phase application of PCT international patent application PCT/CN2021/120573, filed on Sep. 26, 2021 which claims the priority to Chinese Patent Application No. 202110065261.1, titled "VALVE DEVICE", filed with the China National Intellectual Property Administration on Jan. 18, 2021, the entire disclosure of which are incorporated herein by reference.

FIELD

The present disclosure relates to a coolant flow-path switching member, and in particular to a valve device.

BACKGROUND

At present, a coolant flow-path switching member is widely used in hybrid power and pure electric vehicle industry. A valve device has a valve core assembly, and the valve core assembly is in transmission connection with a transmission mechanism through a valve core shaft. The transmission mechanism, such as a gear reduction mechanism, can drive the valve core assembly to rotate driven by a motor, so as to switch a connecting portion which is in communication with the valve core assembly. Specific control involves how to ensure a position of the valve core assembly to be relatively accurate.

SUMMARY

An object according to the present disclosure is to provide a valve device with a relatively accurate position of the valve core assembly, so as to improve the control accuracy of the valve device.

In order to achieve the above object, the following technical solution is provided according to the present disclosure: a valve device includes a housing and a valve core assembly, the housing has a mounting cavity, part of the valve core assembly is located in the mounting cavity, the housing includes a bottom portion and a side portion, multiple connecting portions are formed on the side portion, the valve core assembly has a communicating cavity with an opening facing the side portion, two or more connecting portions are in communication through the communicating cavity, the valve core assembly has a position-limiting portion, the housing has a stop portion, and the position-limiting portion abuts against the stop portion and limits the valve core assembly from continuing to move toward the stop portion when the valve core assembly rotates to a predetermined position.

In the present disclosure, by providing the position-limiting portion in the valve core assembly of the valve device and providing the stop portion in the housing, the position-limiting portion abuts against the stop portion and limits the valve core assembly from continuing to move toward the stop portion when the valve core assembly rotates to a predetermined position; so that a reference position between the valve core assembly and the housing is formed and a position of the valve core assembly is determined, so as to improve the control accuracy for the valve device.

DETAILED DESCRIPTION OF THE EMBODIMENTS

Figure 1:
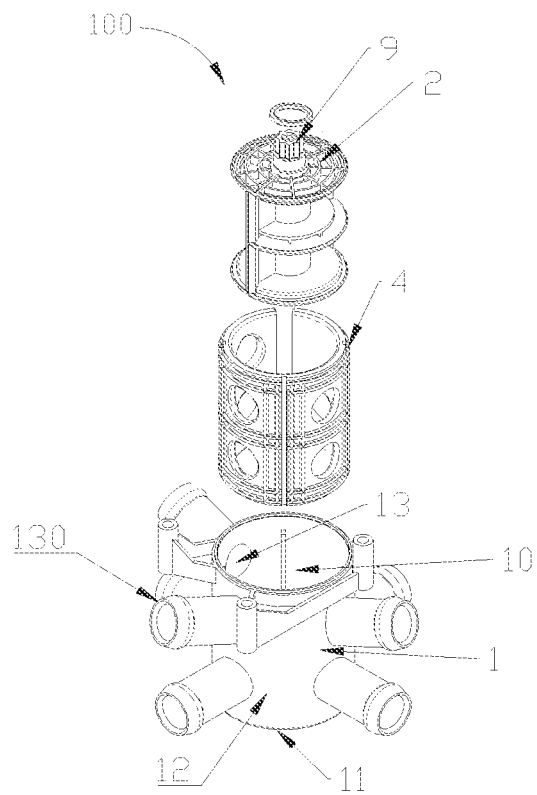
FIG. 1 is a schematic exploded view of a valve device.

The present disclosure is further illustrated hereinafter in conjunction with drawings and specific embodiments.

A valve device 100 is applied to a heat exchange system, such as a vehicle air conditioning system or a household air conditioning system. Specifically, a working medium flowing through the valve device may be water, a mixture of water and other liquids, or other coolants with thermal conductivity. The valve device can distribute the working medium, thereby controlling a flow direction of the working medium in the flow path of the heat exchange system, which can improve and optimize the control performance of the flow path of the heat exchange system.

The valve device 100 can be used in the air conditioning system of a new energy vehicle and is configured to switch or change a flow direction of heating ventilation and air conditioning flow path, battery cooling flow path and battery heating flow path of the air conditioning system. The valve device has at least three flow paths, and the valve device may be located in two or more heat exchange system loops, and is configured to cooperate with the heat exchange system to switch the flow paths, or communicate an inlet with a cavity of the valve device 100, so as to realize the distribution of the flow rate of the working medium in different flow paths of the heat exchange system.

Referring to FIGS. 1 to 13, the valve device 100 includes a housing 1 and a valve core assembly 2, the housing 1 has a mounting cavity 10, at least part of the valve core assembly 2 is located in the mounting cavity 10, the housing 1 includes a bottom portion 11 and a side portion 12, and multiple connecting portions 13 are formed on the side portion 12. In this embodiment, the number of the connecting portions 13 is 6 or 7, or the number of the connecting portions may be other integers ranging from 3 to 10, such as 3, 4, 5, 7, 8, 9 or 10. In this embodiment, multiple connecting portions 13 are arranged along a circumferential direction of the side portion 12 and extend radially. In this embodiment, multiple connecting portions 13 are arranged in two layers axially, which can save the circumferential space. Alternatively, the connecting portions 13 may be arranged in more than two layers, or in a same single layer, as long as a structure of a communicating cavity of the valve core assembly is modified accordingly. In other embodiments, multiple connecting portions 13 may be located on a same side of the side portion, for example, the connecting portions 13 are substantially located on a same flat surface. In this embodiment, the connecting portions 13 are connected to connecting pipes 130, the connecting portions 13 are connected to the system through the connecting pipes 130, and the connecting pipes 130 in this embodiment are integrated with the housing 1 and are formed during the injection molding of the housing. Certainly, the valve device may not be provided with the connecting pipes, but a connecting surface is provided on each connecting portion, an outward portion of the connecting portion is located in the connecting surface, and the connecting surface may be a flat surface or a cross section thereof may be an arc surface. The valve core assembly 2 has a communicating cavity 21 which faces the side portion 12, and the connecting portions 13 are in communication through the communicating cavity 21. In order to ensure the sealing of the valve core assembly 2 and the housing 2, especially to ensure that it is not allowed to flow through other gaps when the connecting portion 13 is in communication with the communicating cavity 2, the valve device 100 further includes a sealing member 4, the sealing member 4 is located between the housing 1 and the valve core assembly 2, and the sealing member may have an integral structure or separated structure, and may have an annular structure or opening structure. In this embodiment, the sealing member 4 is in position-limiting connection with the housing 1, and the valve core assembly 2 is rotatable relative to the sealing member 4. Certainly, the sealing member may be in position-limiting connection with connected to the valve core assembly, the sealing member 4 is rotatable relative to the housing 1, the valve core assembly 2 is fixed to or in position-limiting connection with the sealing member 4, and the valve core assembly 2 drives the sealing member 4 to rotate.

Figure 8:
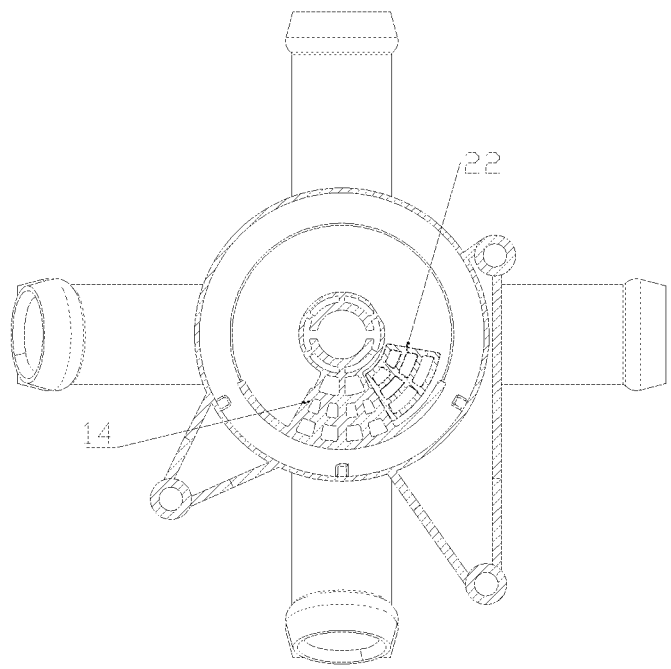
FIG. 8 is a schematic view showing a first embodiment of the relative position relationship between the valve core assembly and the housing in case that the valve core assembly is located in a first predetermined position.
Figure 9:
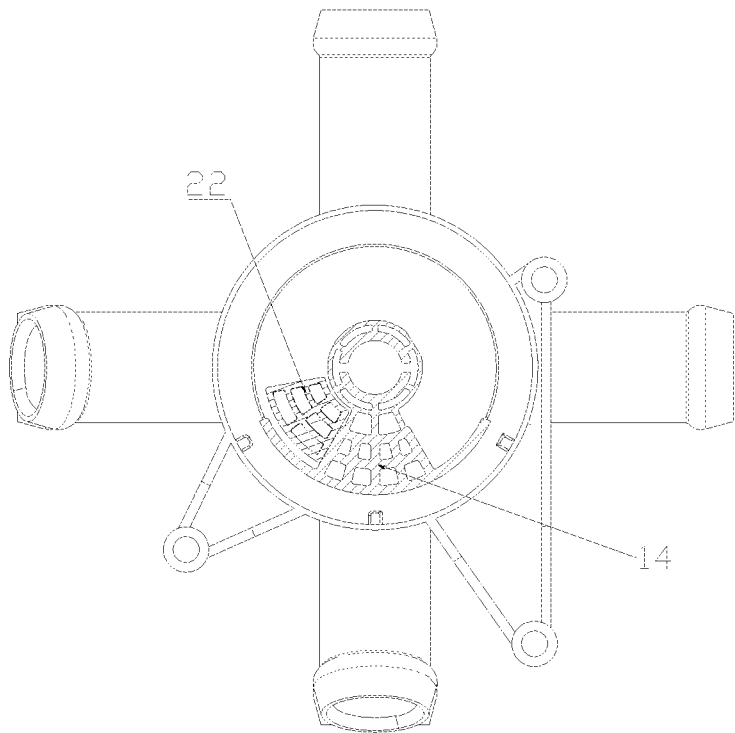
FIG. 9 is a schematic view showing the relative position relationship between the valve core assembly and the housing in case that the valve core assembly is located in a second predetermined position.
Figure 12:
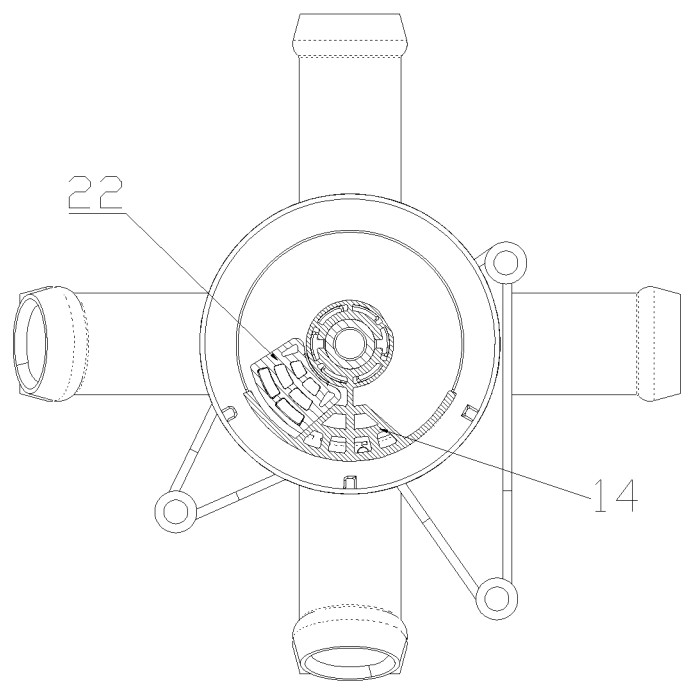
FIG. 12 is a schematic view showing a second embodiment of the relative position relationship between the valve core assembly and the housing when the valve core assembly is located in the first predetermined position.

The valve core assembly 2 includes a position-limiting portion 22, the housing 1 includes a stop portion 14, and the position-limiting portion 22 abuts against the stop portion 14 and limits the valve core assembly 2 from continuing to move toward the stop portion 14 when the valve core assembly rotates to a predetermined position. Referring to FIG. 8, FIG. 9 and FIG. 12, in this embodiment, the valve device has two predetermined positions, FIG. 8 corresponds to a first predetermined position, and FIG. 9 corresponds to a second predetermined position. In this way, at least one reference position is formed between the valve core assembly 2 and the housing 1 at the predetermined positions during substantial one-round rotation of the valve core assembly rotates. In this embodiment, two reference positions are formed, which are respectively the first predetermined position and the second predetermined position, which is beneficial to determining the position of the valve core assembly 2 relative to the housing 1 so as to improve the control accuracy for the valve core assembly 2 and ensure the accuracy and reliability of the communication between the connecting portions and the communicating cavity of the valve core assembly.

Figure 5:
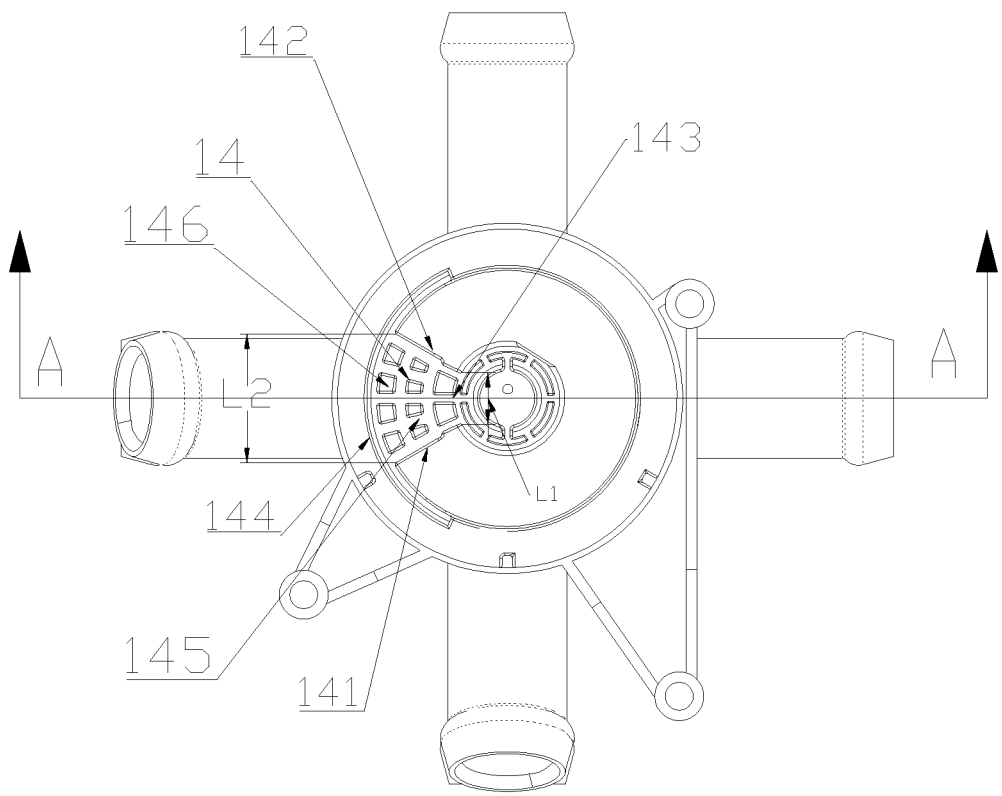
FIG. 5 is a schematic top view of a first embodiment of a housing.
Figure 6:
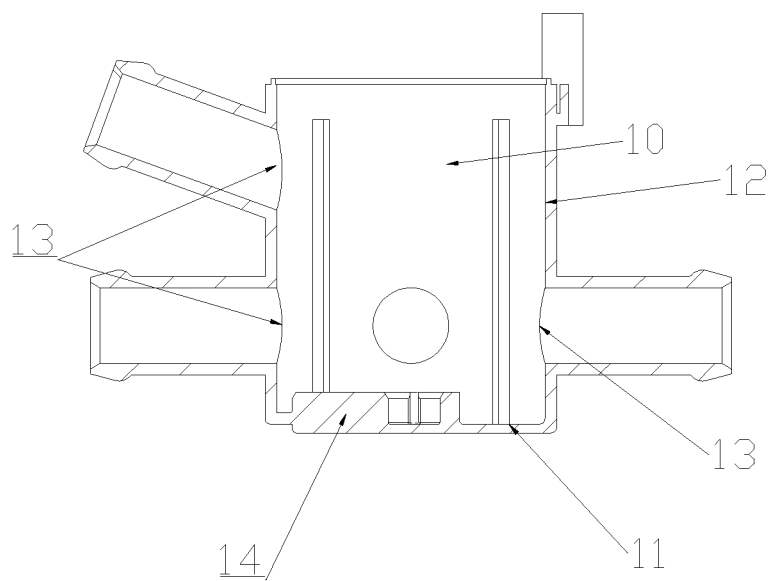
FIG. 6 is a schematic cross-sectional view of the housing taken along line A-A in FIG. 5.
Figure 7:
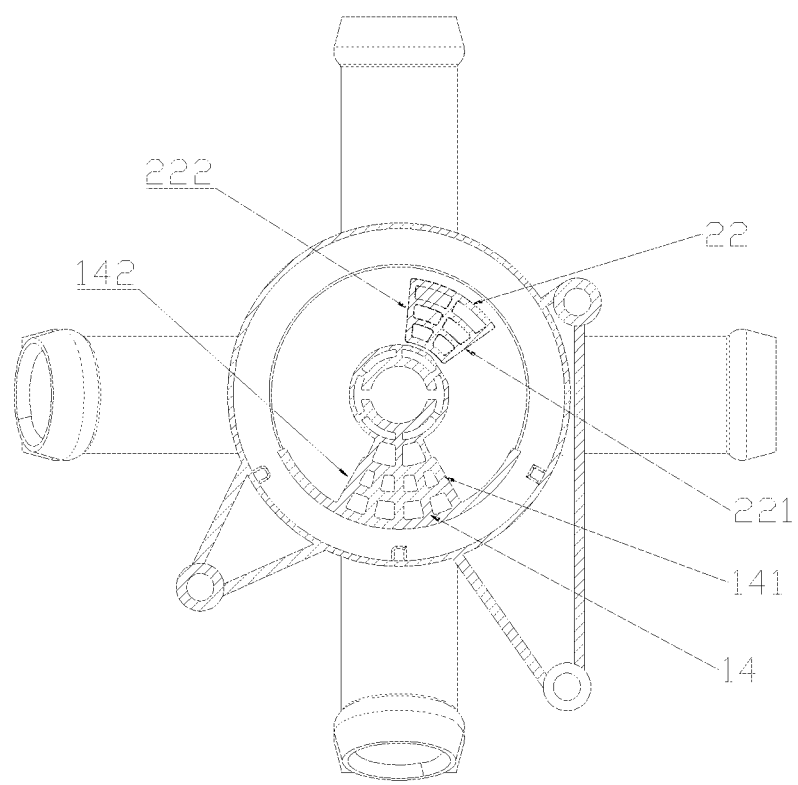
FIG. 7 is a schematic view showing a relative position relationship between the valve core assembly and the housing during operation.

In this embodiment, as shown in FIG. 5 and FIG. 6, the stop portion 14 is a protruding portion, and the protruding portion is defined as a first protruding portion. The stop portion 14 protrudes from the bottom portion 11 toward the mounting cavity 10, the stop portion 14 includes a first stop portion 141 and a second stop portion 142. An inner side and an outer side of the stop portion are defined as a first end portion 143 and a second end portion 144, respectively, and an outer circumference of the stop portion 14 includes the first stop portion 141 and the second stop portion 142, the first end portion 143 and the second end portion 144 are connected to or integrated with the first stop portion 141 and the second stop portion 142, a distance from the first end portion 143 to a center axis o of the valve core assembly is less than a distance from the second end portion 144 to the center axis o of the valve core assembly. From the first end portion 143 to the second end portion 144, that is, along a radial direction of the housing, a distance between the first stop portion 141 and the second stop portion 142 at the first end portion 143 is defined as a first distance L1, the distance between the first stop portion 141 and the second stop portion 142 at the second end portion 144 is defined as a second distance L2, and the first distance L1 is less than the second distance L2; or in other words, along the radial direction of the housing and from the first end portion to the second end portion, the distance between the first stop portion 141 and the second stop portion 142 does not decrease with the increase of the radius and at least increases at the second end portion. Since the shear force is generated during the valve core assembly rotates relative to the housing, and the closer the valve core assembly is to the outer circumference, the greater the shear force is, so that the increase of distance at the second end portion is beneficial to increasing the strength of the stop portion. In this embodiment, an external contour of a cross section of the stop portion 14 is substantially fan-shaped, the stop portion 14 has a hollow structure, protruding ribs 145 are formed inside the stop portion 14, and a recessed portion 146 is formed between adjacent protruding ribs. One, two or more protruding ribs 145 may be provided, and the protruding ribs 145 are staggered when multiple protruding ribs 145 are provided, which is beneficial to improving the strength of the position-limiting portion. In addition, since the housing 1 is an injection molded member, a thickness of the protruding ribs 145 is substantially the same as a thickness of the housing 1, which reduces the deformation caused by uneven thickness after injection molding.

Figure 2:
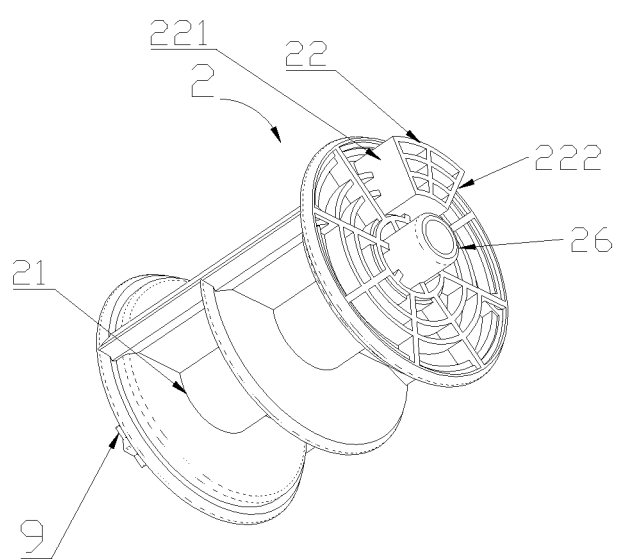
FIG. 2 is a schematic perspective view of a first embodiment of a valve core assembly.
Figure 3:
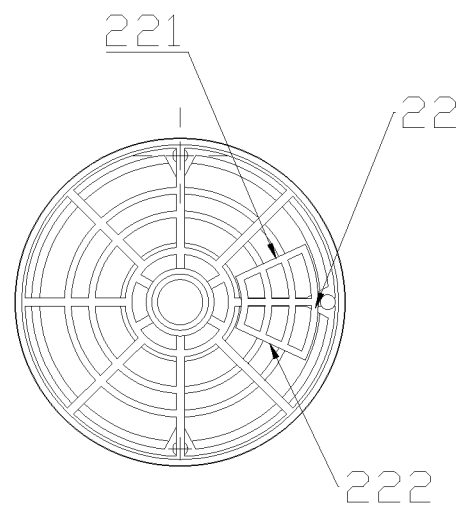
FIG. 3 is a schematic front view of the valve core assembly in FIG. 2.
Figure 4:
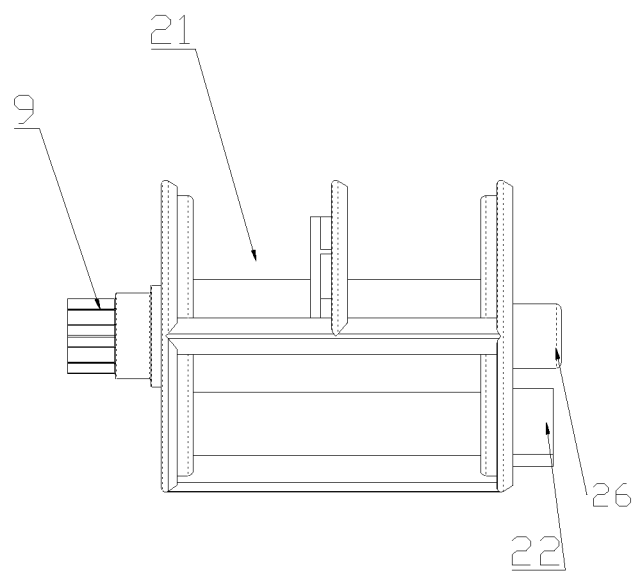
FIG. 4 is another schematic front view of the valve core assembly in FIG. 2.

Referring to FIG. 2 to FIG. 4, in this embodiment, the position-limiting portion 22 is located at one end of the valve core assembly 2, a transmission portion 9 is provided at the other end of the valve core assembly, and the valve core assembly is in transmission connection with a driving gear or other transmission member by the transmission portion 9. Referring to FIG. 1, the position-limiting portion 22 is located at a lower end of the valve core assembly, or in other words, the position-limiting portion 22 is located at one end, close to the bottom portion 11 of the housing, of the valve core assembly 2 along an axial direction of the valve core assembly. The position-limiting portion 22 includes a first abutting portion 221 and a second abutting portion 222, the first abutting portion 221 and the second abutting portion 222 are located on sides of the position-limiting portion, as shown in FIG. 8, the first abutting portion 221 is in surface contact with the first stop portion 141 when the valve core assembly rotates to the first predetermined position, or in other words, the first abutting portion 221 is in surface contact with the first stop portion 141 when the valve core assembly rotates clockwise to the first predetermined position; the second abutting portion is in surface contact with the second stop portion when the valve core assembly rotates to the second predetermined position, or in other words, the second abutting portion is in surface contact with the second stop portion when the valve core assembly rotates counterclockwise to the second predetermined position. The surface contact can have a relatively high mechanical strength. Certainly, it is not limited to a complete surface contact herein, but there may be a small angle difference, such as 0.5 degrees to 1 degree therebetween. Outer side portions are in contact first as being in contact, even though an included angle between the first abutting portion 221 and the second abutting portion 222 is 0.5 degrees to 1 degree greater than an included angle between the first stop portion 141 and the second stop portion 142; or a difference between the included angle between the first abutting portion 221 and the second abutting portion 222 and the included angle between the first stop portion 141 and the second stop portion 142 is within 0.5 degrees taking into account the torque.

In this embodiment, the valve core assembly 2 is an integral injection molded member, the position-limiting portion 22 is a protruding portion, the protruding portion is defined as a second protruding portion, the second protruding portion extends along the axial direction of the valve core assembly, the position-limiting portion 22 has a hollow structure, multiple staggered reinforcing ribs 221 and gaps 222 between adjacent reinforcing ribs are formed inside the position-limiting portion 22, the reinforcing ribs are beneficial with respect to improving the strength of the position-limiting portion of the valve core assembly, and the gaps are beneficial with respect to reducing a thickness of the second protruding portion and reducing the deformation of the valve core assembly.

In this embodiment, the position-limiting portion 22 is substantially fan-shaped, and a center axis of the fan-shaped position-limiting portion 22 is coaxial with the center axis of the valve core assembly.

The housing 1 and the valve core assembly 2 are integral injection molded members, the manufacturing process of which is simple. The position-limiting portion and the stop portion are arranged along the axial direction of the valve device, and the connecting portions and the communicating cavity are located on a peripheral side portion of the valve device, so that the arrangement of the position-limiting portion and the stop portion do not interfere with the arrangement of the connecting portions and the communicating cavity.

In this embodiment, the position-limiting portion 22 is located at one end of the valve core assembly 2, the position-limiting portion 22 includes the first abutting portion 221 and the second abutting portion 222; the stop portion 14 is located on the bottom portion of the housing, the stop portion 14 includes the first stop portion 141 and the second stop portion 142. According to the position shown in FIG. 1 in combination with FIG. 7, when the valve core assembly 2 rotates clockwise to the first predetermined position which is as shown in FIG. 8, the first abutting portion 221 abuts against the first stop portion 141 and limits the valve core assembly 2 from continuing to move toward the first stop portion 141; when the valve core assembly 2 in FIG. 7 rotates counterclockwise to the second predetermined position which is as shown in FIG. 9, the second abutting portion 222 abuts against the second stop portion 142 and limits the valve core assembly 2 from continuing to move toward the second stop portion 142. In this way, there are two position-limiting references during the one-round rotation of the valve device, and it thus has one rotation reference for each of the forward rotation and the reverse rotation, which further improves the control accuracy for the valve core assembly 2, and ensures the accuracy and reliability of the communication of the connecting portions.

In the first embodiment, as shown in FIGS. 2 to 9, the center axis of the fan-shaped stop portion is coaxial with the center axis of the valve core assembly, and the center axis of the fan-shaped position-limiting portion is coaxial with the center axis of the valve core assembly.

Figure 10:
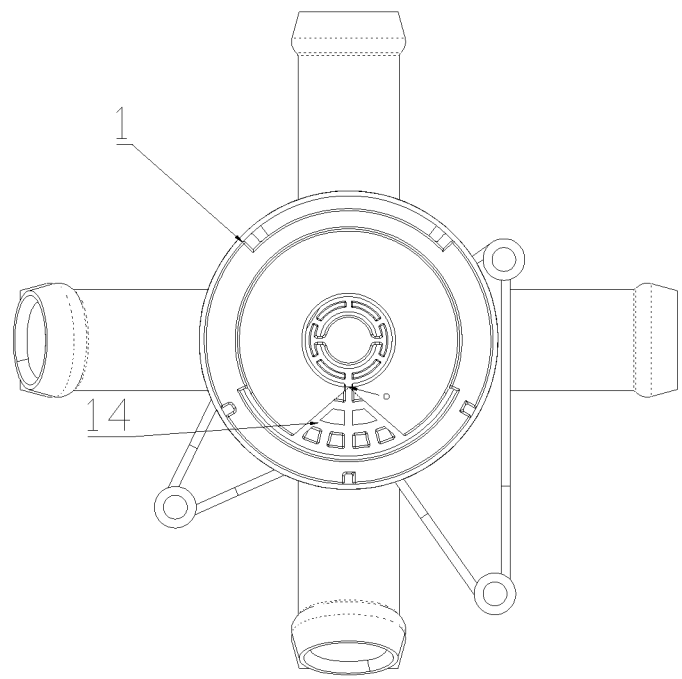
FIG. 10 is a schematic top view of a second embodiment of the housing.
Figure 11:
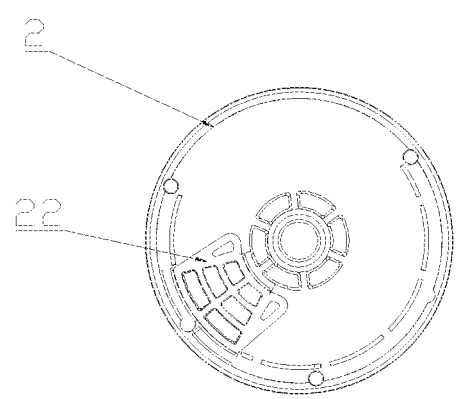
FIG. 11 is a schematic front view of a second embodiment of the valve core assembly.

In the second embodiment, as shown in FIGS. 10 to 12, the center axis of the fan-shaped stop portion is not coaxial with the center axis of the valve core assembly, the center axis of the fan-shaped stop portion is located at a circumference of the radius of the center axis of the valve core assembly; and side walls of the position-limiting portion are arranged in parallel. In this embodiment, a volume of the stop portion is less than the stop portion in the first embodiment, which is beneficial to reducing a volume of the housing.

Figure 13:
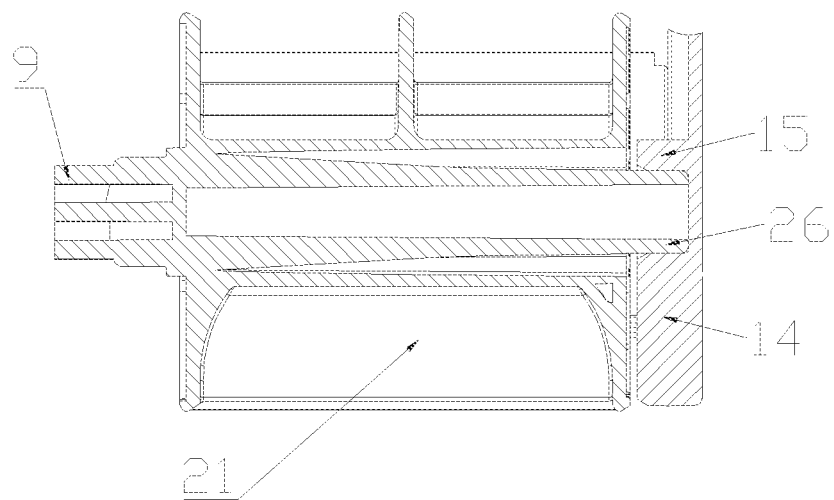
FIG. 13 is a schematic cross-sectional view showing another combined structure of the valve core assembly and the housing.

Referring to FIG. 13, the housing further includes a valve core seat 15, and a recessed portion is formed in the valve core seat 15 to accommodate and limit a supporting shaft 26 of the valve core assembly. The stop portion 14 is integrated with the valve core seat 15, for example, the housing is a plastic member processed by injection molding, a height of the valve core seat 15 is the same with a height of the stop portion 14, the valve core seat 2 further includes the supporting shaft 26, a height of the supporting shaft 26 protruding from an end surface of the valve core assembly is substantially the same with a protruding height of the position-limiting portion 22, which facilitates of injection molding and demoulding. When the valve core assembly 2 is assembled with the housing 1, the supporting shaft 26 is position limited to and supported on the valve core seat 15, the valve core assembly 2 can rotate around a center axis of the supporting shaft 26, and the height of the stop portion 14 is substantially the same with the height of the position-limiting portion. In addition, it may exist a certain difference between the height of the valve core seat and the height of the stop portion, and the difference between the height of the valve core seat and the height of the stop portion does not exceed 2 mm, for example, the height of the valve core seat is slightly greater than the height of the stop portion. Similarly, the height of the supporting shaft protruding from the end surface of the valve core assembly matches with the recessed portion and the valve core seat, and the difference between the height of the supporting shaft protruding from the end surface of the valve core assembly and the protruding height of the position-limiting portion does not exceed 2 mm.

It should be noted that the above embodiments are merely used to illustrate the present application and not to limit the technical solutions described in the present application. Although the present application has been described herein in detail with reference to the above embodiments, those of ordinary skill in the art should understand that those skilled in the art may still modify or equivalently replace the present application, and all technical solutions and its improvements that do not apart from the spirit and scope of the present application should be covered by the scope of the claims of the present application.

The invention claimed is:
1. A valve device, comprising a housing and a valve core assembly, wherein the housing has a mounting cavity, at least part of the valve core assembly is located in the mounting cavity, the housing comprises a bottom portion and a side portion, the side portion has at least three connecting portions, the valve core assembly has a communicating cavity with an opening facing the side portion, at least two of the connecting portions are in communication through the communicating cavity, wherein the valve core assembly has a position-limiting portion, the housing has a stop portion, and the position-limiting portion abuts against the stop portion and limits the valve core assembly from continuing to move toward the stop portion when the valve core assembly rotates to a predetermined position,
wherein the valve core assembly is an injection molded member, the valve core assembly further comprises a supporting shaft, and the supporting shaft axially protrudes from one end surface of the valve core assembly close to the bottom portion, and
wherein the housing comprises a valve core seat, the supporting shaft is position limited to and supported on the valve core seat, and the stop portion is integrated with the valve core seat.

2. The valve device according to claim 1, wherein the position-limiting portion is located at a lower end of the valve device, or the position-limiting portion is located at an end, close to the bottom portion of the housing, of the valve core assembly along an axial direction of the valve core assembly; and the stop portion is located at the bottom portion of the housing.

3. The valve device according to claim 2, wherein the position-limiting portion comprises a first abutting portion and a second abutting portion, the stop portion comprises a first stop portion and a second stop portion, the valve device has two positions: the first abutting portion of the position-limiting portion abuts against the first stop portion and limits the valve core assembly from continuing to move toward the stop portion in a case that the valve core assembly is located in a first predetermined position, and the second abutting portion of the position-limiting portion abuts against the second stop portion and limits the valve core assembly from continuing to move toward the stop portion in a case that the valve core assembly is located in a second predetermined position.

4. The valve device according to claim 1, wherein the position-limiting portion comprises a first abutting portion and a second abutting portion, the stop portion comprises a first stop portion and a second stop portion, the valve device has two positions: the first abutting portion of the position-limiting portion abuts against the first stop portion and limits the valve core assembly from continuing to move toward the stop portion in a case that the valve core assembly is located in a first predetermined position, and the second abutting portion of the position-limiting portion abuts against the second stop portion and limits the valve core assembly from continuing to move toward the stop portion in a case that the valve core assembly is located in a second predetermined position.

5. The valve device according to claim 4, wherein the stop portion protrudes from the bottom portion of the housing toward the mounting cavity, an inner side and an outer side of the stop portion are defined as a first end portion and a second end portion, respectively, an outer circumference of the stop portion comprises the first stop portion and the second stop portion, the first end portion and the second end portion are located between the first stop portion and the second stop portion, a distance from the first end portion to a center axis of the valve core assembly is less than a distance from the second end portion to the center axis of the valve core assembly; from the first end portion to the second end portion and along a radial direction of the housing, a distance between the first stop portion and the second stop portion at the first end portion is defined as a first distance, the distance between first stop portion and the second stop portion at the second end portion is defined as a second distance, and the first distance is less than the second distance.

6. The valve device according to claim 5, wherein the position-limiting portion is located at one end of the valve core assembly, the position-limiting portion protrudes along the axial direction of the valve core assembly, the position-limiting portion has a hollow structure, at least two reinforcing ribs which intersects with each other or are connected with each other are formed inside the position-limiting portion, and the first abutting portion and the second abutting portion are located on a side surface of the position-limiting portion.

7. The valve device according to claim 6, wherein a center axis of the fan-shaped stop portion is coaxial with the center axis of the valve core assembly, the position-limiting portion is substantially fan-shaped, and a center axis of the fan-shaped position-limiting portion is coaxial with the center axis of the valve core assembly.

8. The valve device according to claim 7, wherein a height of the valve core seat is the same with a height of the stop portion or a difference between a height of the valve core seat and a height of the stop portion does not exceed 2 mm, and a difference between a height of the supporting shaft protruding from an end surface of the valve core assembly and a protruding height of the position-limiting portion does not exceed 2 mm.

9. The valve device according to claim 6, wherein a center axis of the fan-shaped stop portion is not coaxial with the center axis of the valve core assembly, a cross section is defined, the center axis of the fan-shaped stop portion is located at a circumference of the radius of the center axis of the valve core assembly; and side walls of the position-limiting portion are arranged in parallel.

10. The valve device according to claim 9, wherein a height of the valve core seat is the same with a height of the stop portion or a difference between a height of the valve core seat and a height of the stop portion does not exceed 2 mm, and a difference between a height of the supporting shaft protruding from an end surface of the valve core assembly and a protruding height of the position-limiting portion does not exceed 2 mm.

11. The valve device according to claim 6, wherein a height of the valve core seat is the same with a height of the stop portion or a difference between a height of the valve core seat and a height of the stop portion does not exceed 2 mm, and a difference between a height of the supporting shaft protruding from an end surface of the valve core assembly and a protruding height of the position-limiting portion does not exceed 2 mm.

12. The valve device according to claim 5, wherein a height of the valve core seat is the same with a height of the stop portion or a difference between a height of the valve core seat and a height of the stop portion does not exceed 2 mm, and a difference between a height of the supporting shaft protruding from an end surface of the valve core assembly and a protruding height of the position-limiting portion does not exceed 2 mm.

13. The valve device according to claim 12, wherein the number of the connecting portions is greater than or equal to 3, an outward portion of each connecting portion is located in a connecting surface, the connecting surface is a flat surface or an arc surface, and the connecting portions are arranged in form of two or more layers along the axial direction of the valve core assembly.

14. The valve device according to claim 5, wherein the housing is an injection molded member, the stop portion is fan-shaped, the stop portion has a hollow structure, at least two protruding rib which intersects with each other or are connected with each other are formed inside the stop portion, the stop portion has a recessed portion;

the first end portion is connected to or integrated with the first stop portion and the second stop portion, and the second end portion is connected to or integrated with the first stop portion and the second stop portion.

15. The valve device according to claim 14, wherein the position-limiting portion is located at one end of the valve core assembly, the position-limiting portion protrudes along the axial direction of the valve core assembly, the position-limiting portion has a hollow structure, at least two reinforcing ribs which intersects with each other or are connected with each other are formed inside the position-limiting portion, and the first abutting portion and the second abutting portion are located on a side surface of the position-limiting portion.

16. The valve device according to claim 14, wherein a height of the valve core seat is the same with a height of the stop portion or a difference between a height of the valve core seat and a height of the stop portion does not exceed 2 mm, and a difference between a height of the supporting shaft protruding from an end surface of the valve core assembly and a protruding height of the position-limiting portion does not exceed 2 mm.

* * * * *